United States Patent
Den Hartog et al.

(10) Patent No.: US 11,026,316 B2
(45) Date of Patent: Jun. 1, 2021

(54) LIGHTING CONTROL

(71) Applicant: SIGNIFY HOLDING B.V., Eindhoven (NL)

(72) Inventors: Edith Danielle Den Hartog, Eindhoven (NL); Martijn Marius Hultermans, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/304,710

(22) PCT Filed: May 19, 2017

(86) PCT No.: PCT/EP2017/062078
§ 371 (c)(1),
(2) Date: Nov. 27, 2018

(87) PCT Pub. No.: WO2017/207295
PCT Pub. Date: Dec. 7, 2017

(65) Prior Publication Data
US 2019/0174610 A1    Jun. 6, 2019

(30) Foreign Application Priority Data
May 30, 2016    (EP) ...................................... 16171919

(51) Int. Cl.
*H05B 37/02*    (2006.01)
*H05B 47/12*    (2020.01)
(Continued)

(52) U.S. Cl.
CPC ............ *H05B 47/12* (2020.01); *G10L 15/005* (2013.01); *G10L 25/51* (2013.01); *G10L 25/63* (2013.01); *H05B 47/155* (2020.01)

(58) Field of Classification Search
CPC ............ H05B 37/0236; H05B 37/0245; H05B 37/0254; H05B 47/12; H05B 47/155;
(Continued)

(56) References Cited

U.S. PATENT DOCUMENTS 5,473,305 A * 12/1995 Hwang ............... B60R 25/1003
180/287
5,760,704 A * 6/1998 Barton .................. G16H 40/20
340/286.07

(Continued)

FOREIGN PATENT DOCUMENTS

CN    105472846 A    4/2016
CN    106211502 A    12/2016
(Continued)

*Primary Examiner* — Amy Cohen Johnson
*Assistant Examiner* — Syed M Kaiser
(74) *Attorney, Agent, or Firm* — Meenakshy Chakravorty

(57) ABSTRACT

A method and apparatus for controlling illumination of a monitored area, by detecting sound (202) originating from an area to be monitored, and analysing the sound to recognise one or more target sounds (222) corresponding to unwanted behaviours such as offensive shouting, chanting or singing. The location of target sounds is determined (224) based on the received sound, and the determined location is exposed to adverse lighting (212), such as over or under exposure, or flickering or flashing effects, which are irritating or uncomfortable.

13 Claims, 3 Drawing Sheets

(51) Int. Cl.
    *G10L 25/51*     (2013.01)
    *G10L 25/63*     (2013.01)
    *G10L 15/00*     (2013.01)
    *H05B 47/155*     (2020.01)

(58) Field of Classification Search
    CPC ......... G10L 15/005; G10L 2/51; G10L 25/63; G10L 25/51
    USPC ...................................... 381/61, 124; 362/86
    See application file for complete search history.

(56) References Cited

U.S. PATENT DOCUMENTS

| | | | | |
|---|---|---|---|---|
| 6,978,030 | B2* | 12/2005 | Reich | H04R 1/02 |
| | | | | 362/86 |
| 7,604,378 | B2* | 10/2009 | Wolf | A01M 1/2083 |
| | | | | 362/227 |
| 8,363,376 | B2* | 1/2013 | Abatemarco | A45B 3/04 |
| | | | | 361/232 |
| 8,666,104 | B2* | 3/2014 | Ivey | H04R 1/028 |
| | | | | 181/141 |
| 8,907,809 | B2* | 12/2014 | Rains, Jr. | G08B 15/00 |
| | | | | 340/815.67 |
| 9,076,450 | B1* | 7/2015 | Sadek | G10L 15/34 |
| 9,857,149 | B2* | 1/2018 | Rubtsov | F21V 5/04 |
| 10,386,060 | B2* | 8/2019 | Dunn | F21V 33/0004 |
| 2008/0001735 | A1* | 1/2008 | Tran | A61B 7/00 |
| | | | | 340/539.22 |
| 2011/0137757 | A1* | 6/2011 | Paolini | G06Q 30/0641 |
| | | | | 705/27.1 |
| 2012/0206050 | A1 | 8/2012 | Spero | |
| 2012/0268017 | A1* | 10/2012 | Griffiths | H05B 33/0842 |
| | | | | 315/152 |
| 2013/0293379 | A1* | 11/2013 | Rains, Jr. | H05B 47/11 |
| | | | | 340/541 |
| 2014/0118144 | A1 | 5/2014 | Amis | |
| 2014/0139353 | A1* | 5/2014 | Wojcieszak | H05B 33/0806 |
| | | | | 340/870.16 |
| 2014/0347845 | A1* | 11/2014 | Pulido, Jr. | A41D 27/085 |
| | | | | 362/103 |
| 2015/0002046 | A1* | 1/2015 | Schlangen | H05B 37/0236 |
| | | | | 315/291 |
| 2015/0077555 | A1* | 3/2015 | Scalisi | H04M 11/00 |
| | | | | 348/143 |
| 2015/0102745 | A1* | 4/2015 | Pijlman | H05B 37/0236 |
| | | | | 315/291 |
| 2016/0217662 | A1* | 7/2016 | Kashar | G04G 21/04 |
| 2016/0245501 | A1* | 8/2016 | Dunn | F21V 33/0004 |
| 2016/0286629 | A1* | 9/2016 | Chen | H05B 37/0272 |
| 2016/0295668 | A1* | 10/2016 | Saijo | H04R 3/14 |
| 2016/0377391 | A1* | 12/2016 | Rubtsov | F21V 7/06 |
| | | | | 315/297 |
| 2017/0070822 | A1* | 3/2017 | Skovenborg | H04R 3/12 |
| 2019/0045603 | A1* | 2/2019 | Wang | H05B 37/0272 |
| 2019/0166674 | A1* | 5/2019 | Mason | H04N 21/8133 |

FOREIGN PATENT DOCUMENTS

| | | |
|---|---|---|
| CN | 207118036 U | 3/2018 |
| JP | 2010508626 A | 3/2010 |
| JP | 2010104456 A | 5/2010 |
| WO | 2013076606 A1 | 5/2013 |
| WO | 2014147524 A1 | 9/2014 |
| WO | 2016005848 A1 | 1/2016 |
| WO | 2017108466 A1 | 6/2017 |

* cited by examiner

LIGHTING CONTROL

CROSS-REFERENCE TO PRIOR APPLICATIONS

This application is the U.S. National Phase application under 35 U.S.C. § 371 of International Application No. PCT/EP2017/062078, filed on May 19, 2017, which claims the benefit of European Patent Application No. 16171919.0, filed on May 30, 2016. These applications are hereby incorporated by reference herein.

TECHNICAL FIELD

The present disclosure relates to control of lighting and particularly but not exclusively, to control of lighting to modify behaviour in venues such as stadiums, arenas and the like.

BACKGROUND

Crowds of spectators in stadiums, arenas, concert halls and the like create an exciting atmosphere and generate large revenues through ticket sales. Unfortunately however, unwanted behaviour such as chanting of an offensive or upsetting nature can occur. This negatively impacts not only those people who are offended, but also other supporters/spectators, organizers, clubs, and venue owners involved. In the example of a football match, such undesirable crowd behaviour could lead to fines for the clubs involved, sanctions such as matches being played without supporters, damage to reputation of a club or organizer and loss of sponsorship. In extreme cases, such unwanted behaviour can potentially lead to violence, and is therefore a safety and security consideration.

However, it is difficult to detect such unwanted behaviour, and to address or mitigate it. It is particularly difficult to detect and take measures in real time.

SUMMARY

According to a first aspect of the invention there is provided a lighting control method comprising detecting sound originating from an area to be monitored; analysing the detected sound to recognise one or more target sounds indicative of a behaviour of one or more subjects in said area; determining, based on the detected sound, the location of the source of the target sounds in the monitored area; and exposing the determined location to a lighting effect to modify said behaviour.

In this way it is possible to detect behaviour, typically unwanted or undesirable behaviour, and to use targeted lighting to modify such behaviour, ideally to discourage or prevent it, or to decrease the number of people participating. Such behaviour includes shouting, chanting or singing of an (predetermined) offensive or upsetting nature for example. What is defined as unwanted may vary from application to application however, and any audible behaviour can be defined as unwanted depending on the circumstances, especially when prohibited by laws, rules or regulations.

Preferably the lighting effect is adverse or unfavourable lighting for those engaging in such behaviour.

In embodiments the lighting effect is designed to frustrate individuals, by preventing them from viewing a game or event by under or over exposure for example. The lighting effect may also be designed to disorientate, or irritate individuals by creating an unpleasant effect such as a flashing or flickering pattern using stroboscopic or low intensity laser light for example.

The lighting effect may be a combination of effects and patterns, such as those set out above. The lighting effect may be dynamically controlled in embodiments, to take into account the variation or evolution of target sounds, and/or behaviour over time. The variation may be in the nature of the sound, such as the detected rhythm of a sound or chant, or the location of the source of a sound, such as a chant spreading to a greater number of participants. Control of the lighting effect may typically include setting illumination parameters such as intensity modulation pattern such as modulation depth, and frequency.

In embodiments, target sounds are sounds generated by people or possibly even animals, such as the barking of a dog. Target sounds may be recognised by techniques such as speech recognition, or recognition of language, intonation, tone, syntax, and rhythm for example. Typically combinations of these factors will be used in an algorithm to recognise target sounds. Such an algorithm may use training data, and may be updated based on machine learning for example. Target sounds may be classified or categorised, to indicate severity, or ranked in terms of urgency or importance where multiple target sounds are detected. This information may be used to determine whether and what action should be taken in embodiments.

Determining the location of target sounds is performed using at least one of time difference of arrival (TDOA) and cross-correlation of detected sound in some embodiments. It is desirable in embodiments for target sounds to be determined to an accuracy to allow a single person, or a small number of people (say 2-5) to be identified. Accuracies of approximately 1 m or less, 2 m or less, or 5 m or less might be suitable in certain applications.

In a further aspect of the invention, there is provided a lighting control apparatus for controlling illumination of a monitored area, said apparatus comprising an input adapted to receive audio data representative of sound originating from an area to be monitored; a sound recognition processor adapted to process the received audio data in order to recognise one or more target sounds indicative of a behaviour of one or more subjects in said area; a sound source location processor adapted process the received audio data in order to determine the location of the source of recognised target sounds in the monitored area; and a lighting control module adapted to control one or more luminaires to selectively illuminate the source of the recognised target sound, based on the determined location, to modify said behaviour.

In embodiments, one or more sound transducers are provided adapted to capture sound from the monitored area and provide audio data to said input. Such sound transducers are typically microphones, or arrays of microphones. Audio data from different transducers may be provided to the sound recognition processor and the sound source location processor, reflecting the different purpose the data is used for. Such different transducers may be provided at different locations in and around the area to be monitored for example. The position, and accuracy and knowledge of the position is particularly important for location determination in embodiments, while quality and resolution may be more important for recognising sounds. Alternatively data from the same or overlapping sets of transducers may be provided for recognition and location, but possibly subject to different filtering and/or pre-processing.

One or more luminaires, adapted to be controlled by said lighting controller, are provided in certain embodiments.

Such luminaires are adapted to provide illumination in the area to be monitored, for example pointing into the spectator stands or seating in a stadium. Such luminaires might typically include spotlights, strobe lights and/or laser lights. In embodiments existing or legacy lighting in an area to be monitored may be used, where it can be controlled by the lighting controller and provide appropriate directionality/discrimination and effects. It is desirable in embodiments to crate lighting effects which can be directed to only a single person or a small group (eg 2-5) of people. Preferably lighting can be directed to an accuracy or 1 m or less, 3 m or less, or 5 m or less.

In one embodiment, speakers are provided, and sound can be created to limit the audibility of unwanted sounds by others, within and/or outside the monitored area. Directional sound output is preferably provided in such embodiments.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention extends to methods, apparatus and/or use substantially as herein described with reference to the accompanying drawings.

Any feature in one aspect of the invention may be applied to other aspects of the invention, in any appropriate combination. In particular, features of method aspects may be applied to apparatus aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which.

DETAILED DESCRIPTION OF THE EMBODIMENTS

Figure 1:
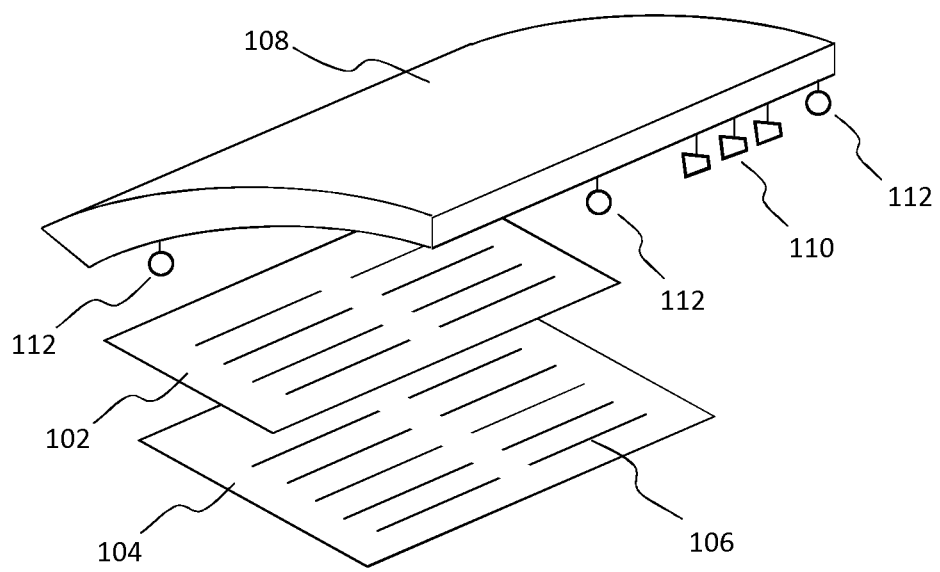
FIG. 1 shows a section of a stadium employing a lighting control system.

FIG. 1 illustrates a region of a stadium, including an upper stand 102 and a lower stand 104. Seating in the stands is designated by lines 106. A roof section 108 is provided above the stands. A light, or lighting array 110 is directed towards the stands for providing illumination or lighting effects to a desired area or location of the stands. Microphones 112 are provided for detecting sound originating from the stands.

Lighting 110 and microphones 112 are shown suspended from the roof section 108, but could alternatively or additionally be located on another structure such as a lighting gantry, or at ground level for example.

Particular areas or portions of the stadium may be designated for monitoring. The region to be monitored may be a particular section or tier of a stand such as those illustrated. All of the spectator areas of the stadium can be monitored, or only designated portions, such as the away team's supporters, or regions where home and away team supporters are in proximity. In some cases, specific seat numbers or rows may be monitored. Each designated portion preferably has its own lighting 110 and sound monitoring 112 capabilities, which can be operated and controlled independently.

Figure 2:
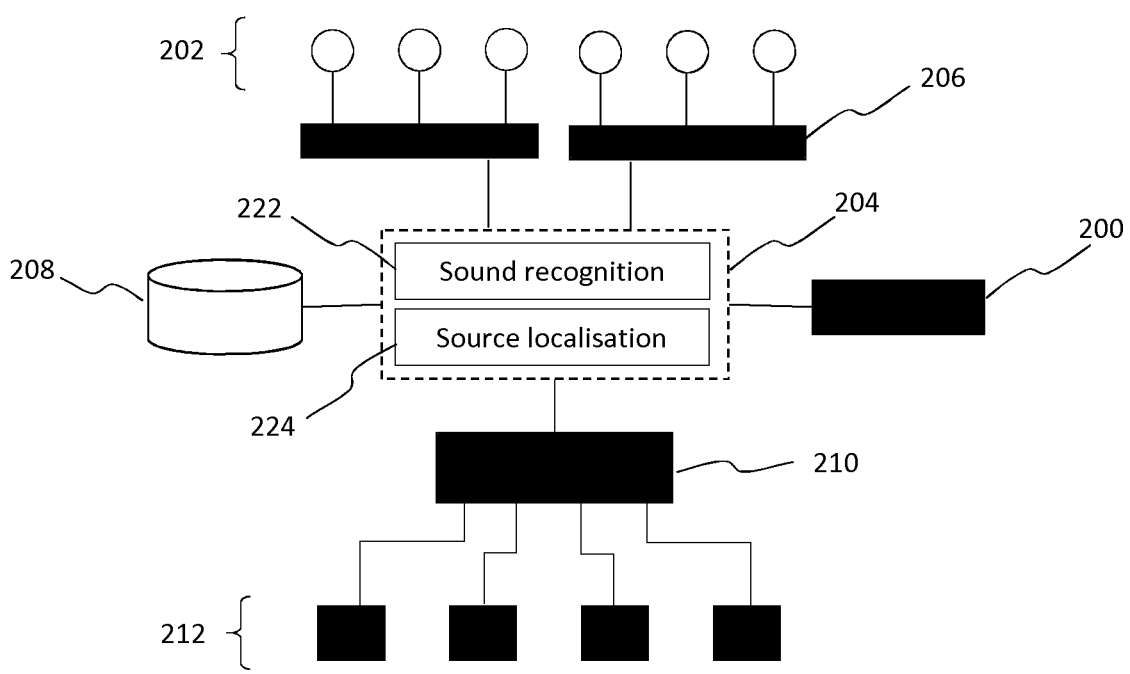
FIG. 2 is a schematic illustration of a lighting control system.

FIG. 2 shows a schematic arrangement of a lighting control system, including sound transducers 202 for converting sound input to audio signals provided to processor 204. Typically microphones are used as sound transducers. Six microphones in two groups of three are shown for the sake of illustration, but ten or more or 100 or more microphones may be provided. Microphones may be provided in an array, or multiple arrays, and provide the function of an 'acoustic camera' in embodiments. The microphone outputs may be provided directly to processor 204, or may be provided via an intermediate processor 206 for performing pre-processing. Microphones 202 may be connected to processor 204 by wired connection, or wirelessly. Where an intermediate processor 206 is included, it may be connected to microphones by wired connection, and be connected to processor 206 wirelessly.

Processor 204 includes a sound recognition module 222 capable of analysing detected sound and recognising specific sounds or patterns of sound, and a source localisation module 224 capable of determining the location of the source of a particular sound, based upon the signals from the transducers 202.

The sound recognition module analyses detected sounds to look for certain audible behaviour, such as offensive chants. Particular words or phrases may be recognized, by performing speech recognition, but recognition may be based on other distinguishing audio characteristics and patterns such as intonation, tone, syntax and rhythm.

Typically recognition is performed using algorithms running on a processor or processors using techniques such as statistical modelling, acoustic modelling and language modelling, which are known in the art. Reference or training data may be used, such as key words or phrases, or unwanted chants and other target sounds previously recorded, and such data may be stored on memory or server 208 for example. Memory or server 208 may be connected to the processor via a network such as the internet.

It will be appreciated that commonly in an environment such as a sports stadium or ground is a noisy environment, and that a mixture of audio signals will be present from multiple sources. Therefore some filtering or signal separation may be performed to isolate sounds from different sources, to assist recognition. Signal separation techniques, such as blind signal separation are known in the art, as are many noise reduction techniques.

Localisation of the source of recognised sounds is preferably performed based on the sound information captured by the microphone or microphone array 202. The sound information may first undergo pre-processing such as noise reduction, by intermediate processor 206 for example. Additionally or alternatively, the sound information may undergo processing by or in combination with the sound recognition module 222. For example, the output of the sound recognition module could be used to filter the input of the source localisation module, even if the two modules use audio data from different microphones or microphone arrays. Localisation of a sound source may performed based on time difference of arrival (TDOA) effectively using triangulation of a signal received at two or more microphones separated by a known distance. Cross-correlation may also be used to determine the position of a sound source received at two or more microphones.

Localisation may provide a distance and direction from a microphone or microphone array receiving the sound, to specify the location in three dimensions. Alternatively only a direction may be provided, e.g. azimuth and elevation angles, relative to a reference point, which may be the location of a microphone, or a central reference for a group of microphones, or a microphone array. In an environment such as a sports stadium, the distance or range can be found by considering the layout of the stadium (eg the position of the spectator stands). However, as will be explained below, a direction without a distance may be sufficient in embodiments of the invention.

The localisation may be sufficiently accurate to identify a single individual as the source of a sound, i.e. an accuracy of approximately 1 m or less. Alternatively, it may be sufficient to identify a small group of individuals, i.e. an accuracy of approximately 2 m or less, or approximately 5 m or less for example.

Sound recognition and source localisation may be performed based on the same audio data ie data from the same microphone(s), or each function may use a separate microphone or set of microphones capturing the same sound or sounds, but having different characteristics or located at different positions for example.

In embodiments the processor 204 can monitor the development of a particular sound, such as a chant, over time. For example a chant may begin with a single individual, but may spread, to an increasing number of individuals. The system can advantageously recognise the evolution of the sound, and determine the spread of its source. Conversely, if only data sufficient to determine the location as corresponding to a group of individuals can be obtained, an individual at the centre of the group may be identified as the possible initiator of unwanted behaviour such as chanting.

A camera 200 may optionally be provided, to capture images and/or video of the determined location of sources of target sounds. For example, if offensive or upsetting chanting is recognized, video can be captured of the person or persons responsible. The pan and tilt of the camera can be controlled according to the output of the source localisation. Focus may also be controlled based on the localisation, or may be automatic.

One or more lights or luminaires 212 are provided in the vicinity of the area to be monitored, such as a section of a sports stadium. The luminaires are capable of providing illumination and lighting effects in the monitored area. The luminaires, under the control of a lighting controller 210, are able to provide specific light output to specifically designated positions or areas of an area being monitored. This is typically by use of one or more luminaires having adjustable pan and tilt axes for steering a directional beam of light. A light source may be mounted on a driven yoke for example, or a twin axis double mirror arrangement could be employed. Alternatively multiple light sources having fixed, or limited beam directionality may be used, and the direction of illumination may be controlled by selective switching of different light sources.

Different types of luminaires may be used in combination, and may be grouped together for the purposes of control. Examples of possible luminaires or light sources include spot lights, strobe lights, and laser sources. In the case of a laser, safety should be an important consideration, and therefore preferably a harmless laser classified as class 1, class 1 M, class 2, or class 2 M should be employed.

The lighting controller 210 can control the output of the luminaires 212 based on information provided from processor 204. The output can be based on the determined location of the sound source, and also the nature or classification of the sound, and optionally user input provided via a user interface (not shown). The control output can by be dynamic, varying in response to changes in the nature and/or location of the sound being monitored. The output is typically controlled to expose a point or area determined by the source localisation 224 to adverse lighting effects. Thus in addition to the direction, the controller can control the pattern of light, controlling parameters such as the intensity, modulation and frequency of light. Direction may be controlled by individual values of pan and tilt for example, however the pattern of light output may be based on pre-set parameter values corresponding to one or more know effects, such as a flashing pattern or a dazzling illumination pattern.

Luminaires may be connected to the lighting controller 210 by wired connection, or wirelessly. Multiple groups of luminaires may be provided, and each group may have a separate lighting controller.

Figure 3:
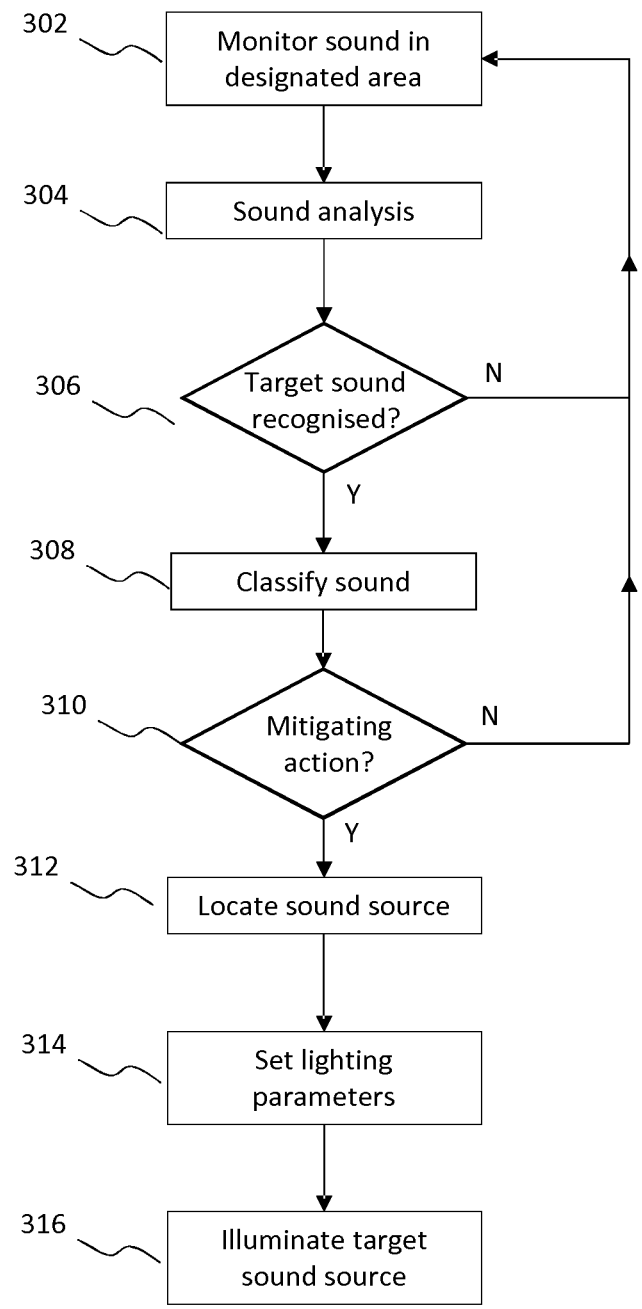
FIG. 3 is a flow diagram illustrating an example of a lighting control method.

Referring to FIG. 3, at an initial step 302, sound in a particular designated area is monitored, preferably substantially continuously. At step 304, the detected sound is analysed for recognisable patterns such as speech or chanting. The analysis may include pre-processing such as noise filtering and signal source separation. The output of step 304 may be distinct recognized sounds or sound portions in embodiments, corresponding to speech or singing for example, or may simply be audio signals resolved by separate sound source in other embodiments.

At step 306, it is determined whether the output of step 304 includes one or more target sounds, for example, as discussed with reference to sound recognition module 22 of FIG. 2. Target sounds are typically any sounds considered by the operator of the system to be representative of undesirable behaviour, such as offensive language, racial slurs, insulting noises or the like. If no target sounds are recognized, the system returns to monitoring in step 302.

Any target sounds recognised can optionally be classified at step 308, and a determination may be made at step 310 as to whether it is desired to take measures in response. In embodiments where multiple measures are possible, an assessment of the type or severity of the unwanted behaviour may be made to determine the response to be taken. For example, the volume, or number of people estimated to be involved may be used to determine whether, and what action should be taken. Such determination may be automated, as the result of the classification 308 for example, or may rely on user input, via a user interface for example. Recognized target sounds, or a subset of recognized target sounds may be played to an operator for example, to alert the operator to detected sound, and corresponding behaviour in the monitored area, and to prompt the operator for a decision as to whether action is to be taken, which decision can be input to the control system.

If it is determined in step 310 that mitigating action is to be taken in response to a particular target sound, the location of the source of that sound is determined, for example as discussed with reference to source localisation module 224 of FIG. 2. Optionally, the location data can be sent to security staff, and can trigger audio and/or video recordings to be made. Alternatively, the determination of whether or not to take mitigating action may be made after the location is determined. In this case, video or images of the source of the sound can additionally be provided to a user or operator, together with corresponding recognized sounds, as part of an operator interaction.

Next, at step 314, lighting parameters for outputting a lighting effect to the source of the target sound are set. Such lighting conditions may include one or a combination of:

lighting designed to frustrate individuals—low-light conditions or over exposure limiting the opportunity to see a game or event for example;

lighting designed to disorientate, or irritate individuals—a flashing or flickering pattern using stroboscopic or low intensity laser light for example;

dynamically controlled lighting based on the detected rhythm of a sound or chant—lights can flash asynchronously to the rhythm of a chant to decrease the chance that other spectators can sing along for example.

For example a light effect will typically be perceived as unpleasant when a light beam of e.g. 500 Lux is directed into the eyes.

In embodiments, the rhythm of a target sound can be detected. Tempo and beat analysis could be performed for example by extracting certain subband envelopes, and analysing the amplitude of those envelopes. In an example a bank of comb filters with periods at each possible tempo could be used. Also, should a target sound corresponds to a known song or chant, the known rhythm of that chant, or at least a template rhythm can be used to ascertain the rhythm of the target sound, even if it differs slightly from the known rhythm, eg in tempo. Based on the detected rhythm, a lighting effect can be produced which is designed to make it difficult for the person or persons involved to continue producing the target sound, such as the chant or song.

Studies have investigated motor control functions used in speech and musical performance, such as timing, sequencing, and spatial organization of motor movements. Auditory and visual interactions with these motor functions have been studied, such as feed forward and feedback interactions, and indicate that motor performance may be significantly affected particularly when feedback is manipulated by delays or distortions. As such asynchronous feedback may significantly disrupt timing of motor performance, making singing or speech for example more difficult. Therefore in embodiments of the present invention, a modifying lighting effect is asynchronous to the rhythm of the target sound. For example, a flashing or pulsing lighting effect with a modulation pattern which is asynchronous to the target sound. The modifying effect may be a delayed and/or distorted feedback effect based on of the detected rhythm in embodiments.

It has been found that the perception of a flickering effect typically depends on the frequency of the flicker and the modulation depth. In determining appropriate values, consideration should be given to conditions such as photosensitive epilepsy (3.5% of epileptic people are sensitive to light flickering). It has been found that such conditions typically exhibit greatest sensitivity to light effects in the range of frequencies from 10 to 30 Hertz. Therefore in one example, a frequency between 2 and 7 or between 35 and 100 Hz is chosen, to avoid this range, with an appropriate margin of safety.

Figure 4:
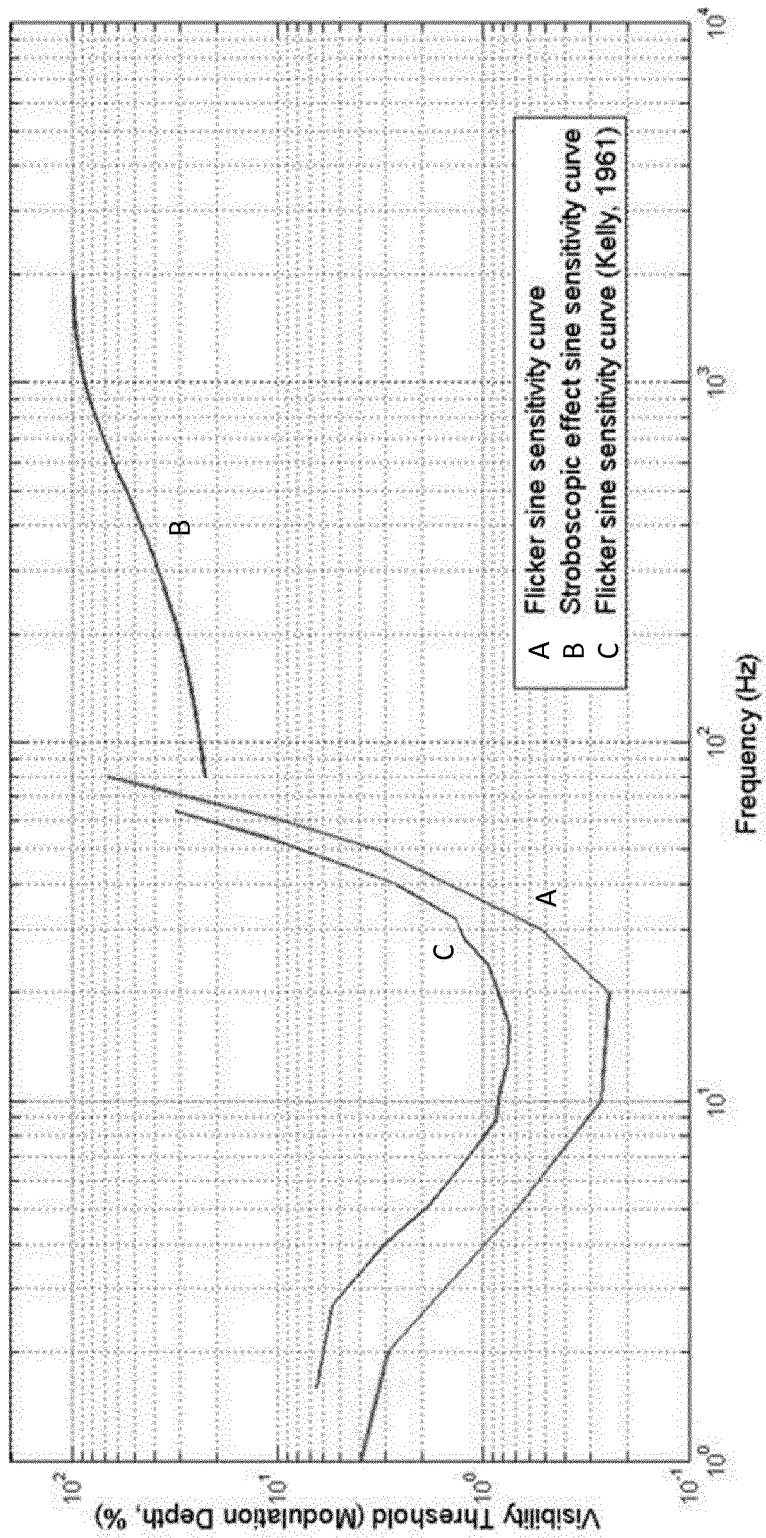
FIG. 4 is a graph illustrating a flicker sensitivity curve.

A modulation depth (contrast of light wave over time) of approximately 5% above the "Flicker sine sensitivity curve" (as shown in FIG. 4) is chosen in embodiments, for a given frequency value.

Lighting effects/conditions can be employed sequentially and/or in combination, in response to detected audio and optionally video. For example lighting patterns can be escalated, from a warning pattern to a stronger, more adverse pattern which acts as an increased deterrent. This may be for a fixed warning period, or in response to continued monitoring of the unwanted behaviour, eg to determine whether it is continuing, increasing or increasing. Conversely a less adverse pattern could be employed in response to behaviour decreasing, or stopping.

Lighting conditions and effects can preferably be directed with a high degree of accuracy and to a small area or range. Preferably lighting effects can be directed to only a single individual, or to only a small group (eg, 3, 4, or 5 people) while leaving neighbouring individuals substantially unaffected. Therefore an effect can preferably be constrained to a target area to an accuracy of 1 m or less, or 3 m or less or 5 m or less. Lighting effects should preferably be difficult or impossible to detect when televised, in order to meet regulations imposed by bodies such as FIFA and UEFA.

Finally, in step 316, the target sound source is illuminated in accordance with the parameters set in step 314. Illumination may be for a pre-determined period or duration, which may be determined in step 316.

It will be understood that the present invention has been described above purely by way of example, and modification of detail can be made within the scope of the invention. Each feature disclosed in the description, and (where appropriate) the claims and drawings may be provided independently or in any appropriate combination.

The various illustrative logical blocks, functional blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the function or functions described herein, optionally in combination with instructions stored in a memory or storage medium. A described processor may also be implemented as a combination of computing devices, e.g., a combination of a DSP and a microprocessor, or a plurality of microprocessors for example. Conversely, separately described functional blocks or modules may be integrated into a single processor. The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, and a CD-ROM.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless.

The invention claimed is:

1. A lighting control method comprising:
   detecting sound originating from an area to be monitored;
   analysing the detected sound to recognise one or more target sounds indicative of a behaviour comprising at least one of shouting, chanting and Singing of one or more subjects in said area;
   determining, based on the detected sound, the location of the source of the target sounds in the monitored area;
   determining a rhythm of the detected sound;
   determining, based on the determined rhythm of the detected sound, an asynchronicity of a lighting effect with respect to the determined rhythm such that the asynchronicity of the lighting effect is correlated to the determined rhythm; and
   controlling one or more luminaires to expose the determined location to the lighting effect that is asynchronous to the determined rhythm.

2. A method according to claim 1, wherein said lighting effect is flashing or flickering lighting.

3. A method according to claim 1, wherein exposing the determined location to a lighting effect includes setting illumination parameters including at least one of intensity, modulation pattern and frequency.

4. A method according to claim 1, wherein analysing the detected sound includes performing speech recognition.

5. A method according to claim 1, wherein analysing the detected sound includes recognising at least one of language, intonation, tone, syntax, or rhythm.

6. A method according to claim 1, wherein analysing the detected sound includes monitoring the evolution of one or more target sounds.

7. A method according to claim 1, wherein determining the location of the source of the target sounds is performed using at least one of time difference of arrival (TDOA) and cross-correlation of detected sound.

8. A method according to claim 1 wherein exposing the determined location to a lighting effect, asynchronous to the determined rhythm, comprises exposing the determined location to a lighting effect designed to discourage or prevent said behavior or to decrease the number of people participating in said behavior.

9. A lighting control apparatus for controlling illumination of a monitored area, said apparatus comprising:
   an input adapted to receive audio data representative of sound originating from an area to be monitored;
   a sound recognition module adapted to process the received audio data in order to recognise one or more target sounds indicative of a behaviour comprising at least one of shouting, chanting and singing of one or more subjects in said area;
   a sound source location module adapted to process the received audio data in order to determine the location of the source of recognised target sounds in the monitored area,
   wherein the lighting control apparatus is configured to determine a rhythm of the sound represented by the audio data and to determine, based on the determined rhythm, an asynchronicity of a lighting effect with respect to the determined rhythm such that the asynchronicity of the lighting effect is correlated to the determined rhythm; and
   a lighting control module adapted to control one or more luminaires to expose the determined location to the lighting effect that is asynchronous to the determined rhythm.

10. An apparatus according to claim 9, further comprising one or more sound transducers adapted to capture sound from the monitored area and provide audio data to said input.

11. An apparatus according to claim 9, further comprising one or more luminaires, adapted to be controlled by said lighting controller.

12. An apparatus according to claim 11, wherein said luminaires include at least one of a spotlight, a strobe light or a laser.

13. A non-transitory computer-readable medium comprising computer program code, which, when executed on one or more processors, causes the one or more processors to perform a lighting control method comprising the steps of:
    detecting sound originating from an area to be monitored;
    analysing the detected sound to recognise one or more target sounds indicative of a behaviour comprising at least one of shouting, chanting and singing of one or more subjects in said area;
    determining, based on the detected sound, the location of the source of the target sounds in the monitored area;
    determining a rhythm of the detected sound; and
    determining, based on the determined rhythm of the detected sound, an asynchronicity of a lighting effect with respect to the determined rhythm such that the asynchronicity of the lighting effect is correlated to the determined rhythm; and
    controlling one or more luminaires to expose the determined location to the lighting effect that is asynchronous to the determined rhythm.

* * * * *